United States Patent [19]

Craggs et al.

[11] Patent Number: 5,183,975
[45] Date of Patent: Feb. 2, 1993

[54] MUFFLER FOR A COOLING SYSTEM OF AN ELECTRIC MOTOR

[75] Inventors: Jack L. Craggs; Robert R. Burke, both of Cincinnati, Ohio

[73] Assignee: Siemens Energy & Automation, Inc., Alpharetta, Ga.

[21] Appl. No.: 700,300

[22] Filed: May 15, 1991

[51] Int. Cl.⁵ .............................................. H02K 5/24
[52] U.S. Cl. ................................... 181/202; 181/205; 181/207; 310/51
[58] Field of Search ............... 181/202, 224, 200, 205, 181/207, 208, 209; 310/51

[56] References Cited

U.S. PATENT DOCUMENTS

| | | | |
|---|---|---|---|
| 771,468 | 10/1904 | Falk . | |
| 1,476,776 | 12/1923 | Stamm et al. | 310/51 |
| 2,505,854 | 5/1950 | Curzon | 181/33 |
| 2,726,807 | 12/1955 | Lewis | 230/130 |
| 2,777,079 | 1/1957 | Egglestone | 310/58 |
| 2,881,337 | 4/1959 | Wall | 310/51 |
| 2,886,721 | 5/1959 | Picozzi | 310/51 |
| 3,389,278 | 6/1968 | Jaeschke | 310/105 |
| 3,980,912 | 9/1976 | Panza | 310/51 |
| 4,007,388 | 2/1977 | Lawyer | 310/51 |
| 4,119,873 | 10/1978 | Sakurai | 310/56 |
| 4,146,112 | 3/1979 | Usry | 181/202 |
| 4,230,960 | 10/1980 | Mayher | 310/51 |
| 4,266,602 | 5/1981 | White et al. | 181/224 X |

Primary Examiner—Michael L. Gellner
Assistant Examiner—Khanh Dang

[57] ABSTRACT

A muffler for an air-cooling system used for channeling air for cooling an electric motor comprises a housing mounted on the electric motor and formed with an air inlet; and an air outlet and an air passage extending between and connecting the inlet and the outlet. Air from outside the housing employed to cool the motor enters through the inlet, flows through the passage and exits through the outlet. Noise having a spectrum of frequencies including a relatively low main discrete frequency, which corresponds to a relatively long wave-length, and a plurality of higher frequencies is generated in the cooling air during operation of the motor and its cooling system. A baffle is positioned within the housing adjacent to the outlet to interrupt lines of sight from the air passage to the outside of the housing. The housing and the baffle are made of a metal or plastic and have sufficient mass to attenuate the higher frequencies of the noise spectrum to a substantial degree. A sound-absorbent material is positioned on the interior surfaces of the housing and has an effective thickness equal to between approximately one-eighth and one-half of the wavelength of the relatively low main discrete frequency of the noise spectrum. The inlet, outlet, and air passage are of large cross section to enable cooling of the motor using low air velocities at low back pressures. The inlet and outlet are located relative to the motor and direct exhaust air in such a manner as to minimize recirculation of the air.

16 Claims, 4 Drawing Sheets

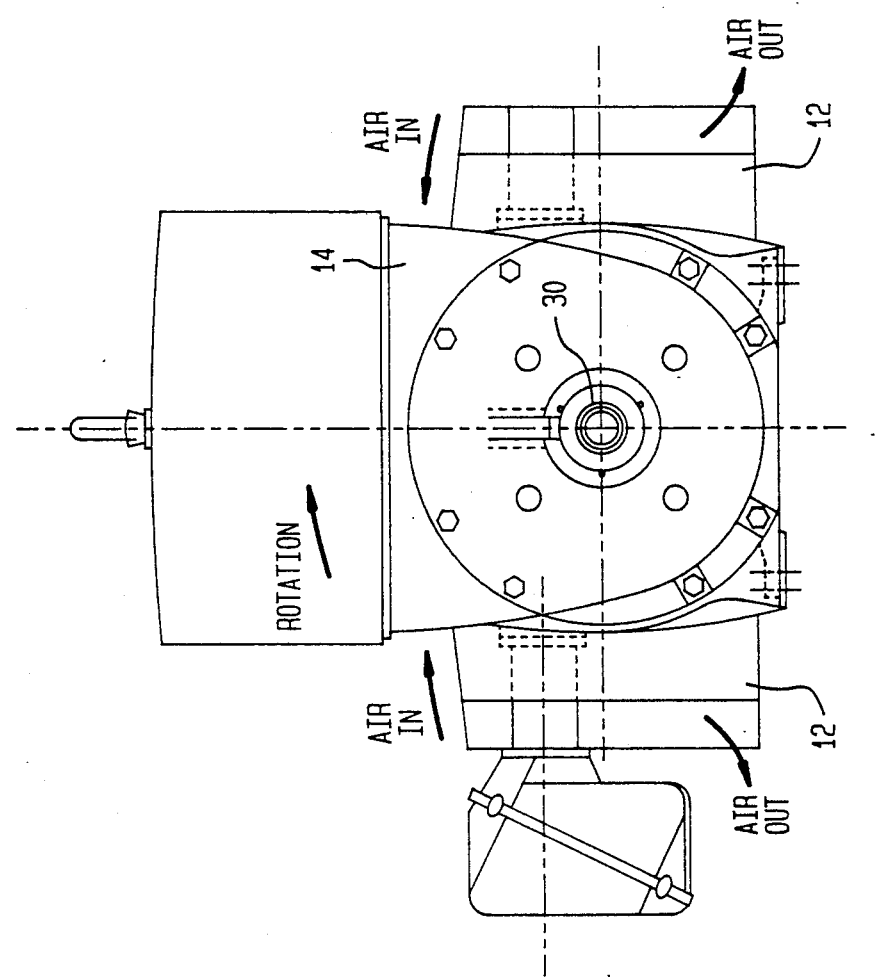
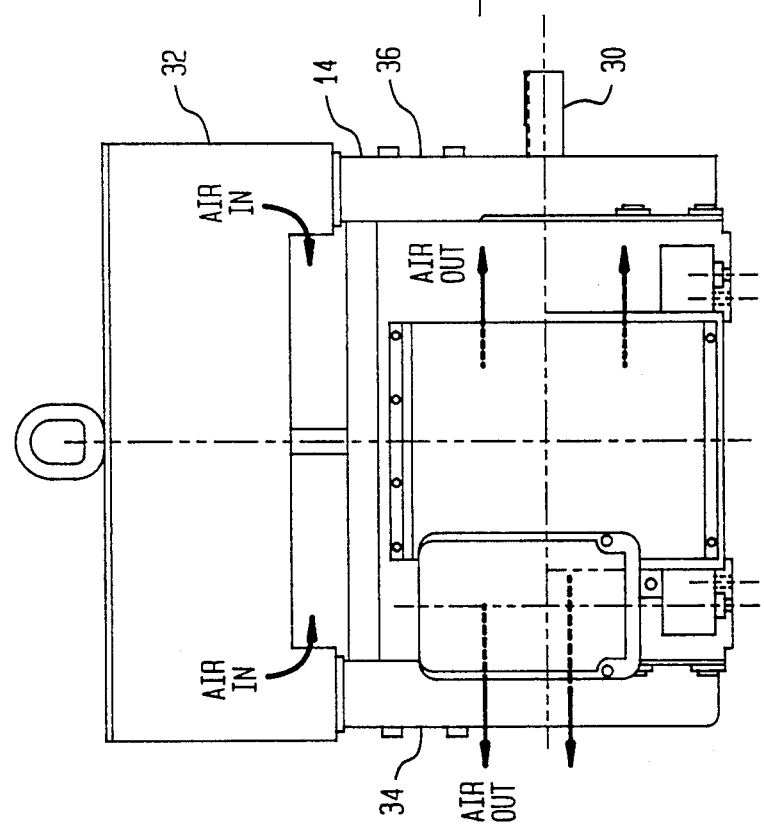

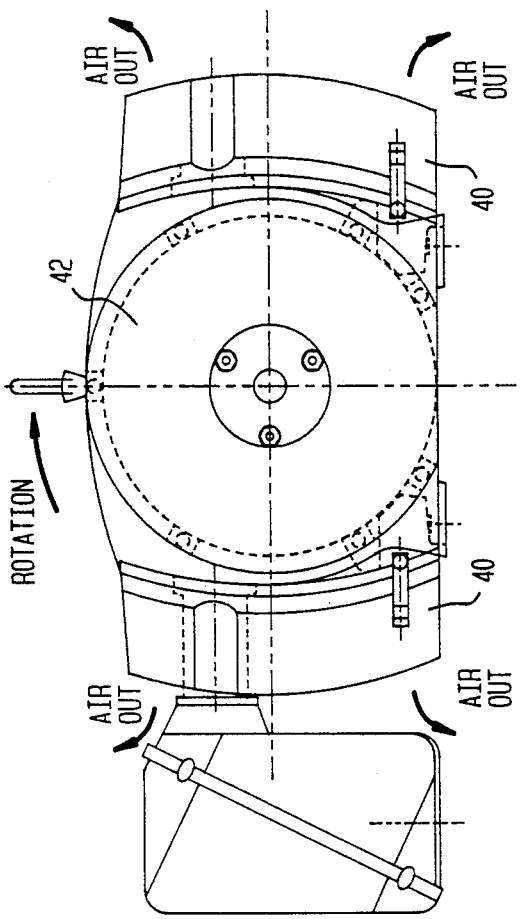
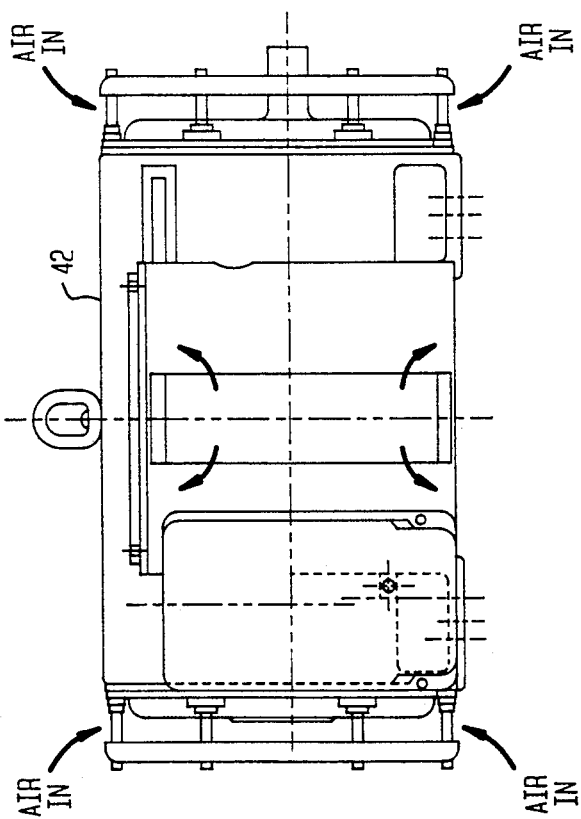

MUFFLER FOR A COOLING SYSTEM OF AN ELECTRIC MOTOR

BACKGROUND OF THE INVENTION

1. Field of the Invention

This invention relates to mufflers for air-cooling systems used for channeling air for cooling heat-generating apparatus and, more particularly, to a novel and highly effective muffler for an air-cooling system used for cooling electric motors, the muffler enabling the system to be operated at a very low perceived noise level.

2. Description of the Prior Art

Electric motors have been developed for many different applications and markets around the world. Over the years, intensive efforts have been made to standardize production and incorporate all the best features into one motor line.

Efficient cooling of electrical apparatus such as electric motors is essential to ensure long life. Electric motors are normally air cooled. For example, the rotor may incorporate blades that cause air to circulate around the motor windings and bearings to dissipate excess heat. In large units, a separate fan may be provided for the forced circulation of air. In either case, means may be employed in order to channel the cooling air so that it flows in close proximity to the motor and in particular to the portions thereof that require the most cooling.

Noise suppression is also important. Electric motors are used in factories and other locations in close proximity to workers, customers, and the general public. Many studies have shown that excessive noise levels can lead to irritability, elevated blood pressure (hypertension) and hearing loss. In order to increase worker satisfaction, improve worker productivity, and in general create a more pleasant environment for workers, customers and the public, it is desirable to make electric motors run as quietly as possible.

The goals of cooling and noise suppression are to some extent contradictory. Efficient cooling necessitates channeling a flow of air into close proximity to various parts of the motor, which leads to a rather labyrinthine air path. The repeated abrupt turns of the air as it moves through the electric motor set up a spectrum of noise within the audio range. In addition, the operation of the motor creates a main discrete noise component as explained below. It is difficult to suppress noise throughout the audio spectrum since measures taken to suppress high-frequency noise may not be very effective in suppressing low-frequency noise and vice versa. Moreover, measures taken to improve cooling efficiency may increase the noise level.

A number of attempts have been made in the past to provide efficient cooling while suppressing excessive noise. A U.S. patent to Picozzi et al. U.S. Pat. No. 2,886,721 discloses a motor enclosure which is lined with a mastic damping compound and has a fiberglass blanket on the damping compound and a wire mesh superposed on the fiberglass blanket. The motor enclosure includes internal baffling. In operation, air is drawn downwardly through louvers provided in the side of a muffler and passed inwardly through openings provided in the bottom of plenum chambers and into a fan. As the rotor revolves, the fan generates an air pressure that directs the incoming air through the stator and then to the muffler unit where the noises generated during its path of travel through the motor are absorbed by the insulation in the muffler unit. As the air enters the muffler unit, it is caused to travel through a tortuous path prior to ejection from the casing.

A patent to Jaeschke No. U.S. Pat. No. 3,389,287 discloses a structure wherein air is drawn into and through inlet passages and impelled through a plenum chamber by a finned rotating spider and inductor drum. The air is then driven out through outlet passages. The sound to be suppressed passes out from the plenum chamber through the inlet and outlet passages. Thus the sound is propagated oppositely to the inlet flow of air and in the same direction as the flow of exhaust air. The wavelength of the sound as it travels in these portions is calculated, and chambers are provided the effective inside lengths of which are about equal to the wavelength peaks at about 870 and 1300 Hz. This is intended to cancel noise at or near 870 Hz and 1300 Hz.

A patent to Sakurai No. U.S. Pat. No. 4,119,873 discloses an electric motor wherein cooling air taken from the outside of the machine is circulated through a housing of the machine by means of a fan, and a casing containing slip rings is mounted on the outside of the housing. A portion of the cooling air pressurized by the fan is circulated through the casing for cooling the slip rings.

Other patents of interest are a patent to Falk No. U.S. Pat. No. 771,468, a patent to Curzon U.S. Pat. No. 2,505,854, a patent to Lewis U.S. Pat. No. 2,726,807, a patent to Egglestone et al. U.S. Pat. No. 2,777,079, a patent to Panza U.S. Pat. No. 3,980,912, a patent to Lawyer et al. U.S. Pat. No. 4,007,388 and a patent to Mayher U.S. Pat. No. 4,230,960.

None of the prior art represents a complete solution to the problem of efficient cooling of electrical apparatus or other heat-generating apparatus combined with maximum suppression of the noise generated by the apparatus and by the cooling system itself.

OBJECTS AND SUMMARY OF THE INVENTION

An object of the invention is to remedy the problems of the prior art noted above, and in particular to provide a muffler for an air-cooling system used for channeling air for cooling electrical apparatus, the muffler separately addressing the problem of reducing relatively high-frequency noise and reducing relatively low-frequency noise. Another object of the invention is to provide such a muffler that is inexpensive to manufacture and that needs very little maintenance.

The foregoing and other objects are attained in accordance with the invention by the provision of a muffler for an air-cooling system used for channeling air for cooling heat-generating apparatus, the muffler comprising: housing means mounted on the heat-generating apparatus and formed with air-inlet means, air-outlet means, and air-passage means extending between and connecting the inlet means and the outlet means, whereby air from outside the housing means employed to cool the heat-generating apparatus enters the housing means through the inlet means, flows through the passage means and exits the housing means through the outlet means, noise having a spectrum of frequencies including a relatively low main discrete frequency, which corresponds to a relatively long wavelength, and plurality of higher frequencies being generated in the cooling air during operation of the heat-generating apparatus and cooling system; baffle means positioned within the housing means adjacent to the outlet means to interrupt lines of sight from the passage means to the outside of the housing means; the housing means and the baffle means being made of a predetermined material and having a predetermined mass, the material and the mass being selected to attenuate direct egress of the higher frequencies of the noise spectrum to a substantial degree; and a sound-absorbent material positioned on selected interior surfaces of the housing means and having an effective thickness equal to between approximately one-eighth and one-half of the lowest main discrete frequency of the noise spectrum; the inlet means, outlet means and air-passage means being of large cross section to enable cooling of the heat-generating apparatus using low air velocities at low back pressures; and the inlet and outlet means being located relative to the heat-generating apparatus and directing exhaust air in such a manner as to minimize recirculation of air.

BRIEF DESCRIPTION OF THE DRAWING

A better understanding of the objects, features, and advantages of the invention can be gained from a consideration of the following detailed description of the preferred embodiments thereof, in conjunction with the appended figures of the drawing, wherein a given reference character always designates the same element or part and wherein:

FIG. 7. is a view in side elevation of apparatus constructed in accordance with the invention as illustrated in FIGS. 1-3 applied to a large electric motor;

FIG. 8. is a view in end elevation of the apparatus of FIG. 7;

FIG. 9. is a view in side elevation of apparatus constructed in accordance with the invention as illustrated in FIGS. 4-6 applied to a large electric motor; and FIG. 10. is a view in end elevation of the apparatus of FIG. 9.

DESCRIPTION OF THE PREFERRED EMBODIMENTS

Figure 2:
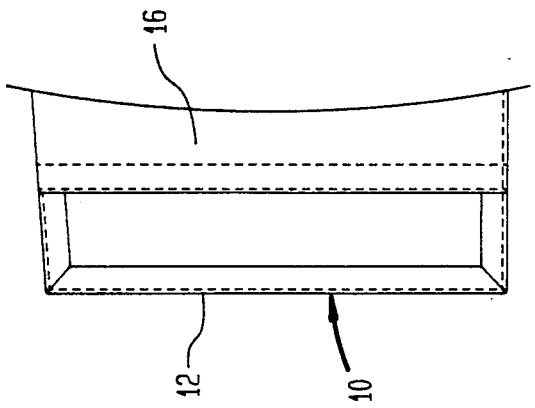
FIG. 2. is a view in end elevation of the muffler of FIG. 1.
Figure 1:
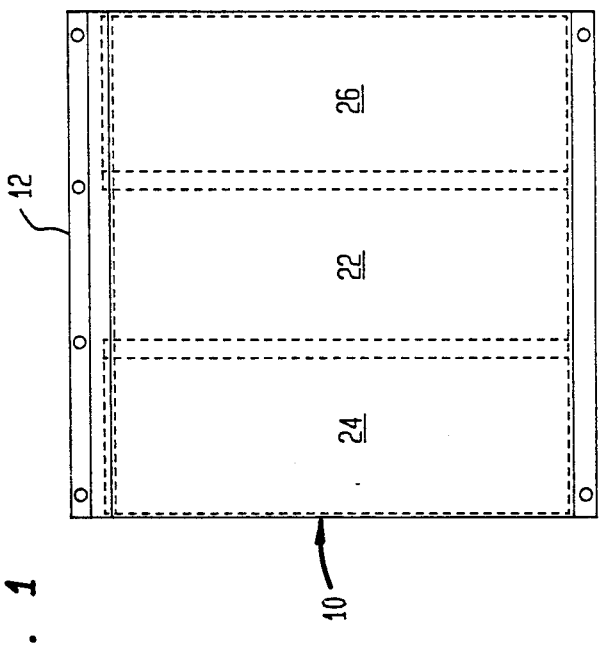
FIG. 1. is a view in side elevation of a first preferred embodiment of a muffler in accordance with the invention for an air-cooling system used for channeling air for cooling heat-generating apparatus.
Figure 3:
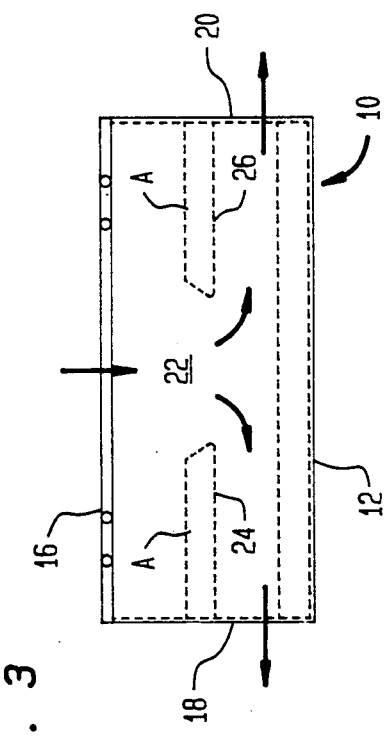
FIG. 3. is a top plan view of the muffler.

FIGS. 1-3 show a first preferred embodiment of a muffler 10 constructed in accordance with the invention. The muffler 10 comprises housing means such as a housing 12 suitable for mounting on heat-generating apparatus such as an electric motor 14 shown in FIGS. 7 and 8. Two such housings 12 are preferably employed, one on either side of the motor 14, as FIG. 8 shows. Each housing 12 is formed with air-inlet means such as an intake duct or inlet 16, air-outlet means such as the outlets 18 and 20, and air-passage means such as an air passage 22 extending between and connecting the inlet 16 and outlets 18 and 20. Thus air from outside the housing 12 employed to cool the electric motor 14 enters the muffler 10 through the inlet 16, flows through the passage 22, and exits through the outlets 18 and 20.

Noise having a spectrum of frequencies including a relatively low main discrete frequency, which corresponds to a relatively long wavelength, and a plurality of higher frequencies is generated in the cooling air during operation of the electric motor 14 and its associated cooling system. There are a number of sources of the noise. The relatively low main discrete frequency, which is typically within the range of 0.5 kHz to 4 kHz, is generated by the passing frequency of the rotor bars in an induction motor. For example, a large motor of this design developing several hundred horsepower may have 47 bars and may rotate at 3600 rpm. Multiplying 47 by 3600 and dividing by 60 gives a passing frequency of 2820 Hz, which is in the audio range and constitutes an objectionable noise if the perceived amplitude is high.

In accordance with the invention a baffle means exemplified by baffles 24 and 26 is positioned within the housing 12 adjacent to the outlets 18 and 20 to interrupt lines of sight from the passage 22 to the outside of the housing 12. The housing 12 and baffles 24 and 26 are made of a predetermined material such as metal or plastic and have a predetermined mass, the material and mass being selected to attenuate direct egress of the higher frequencies of the noise spectrum to a substantial degree. Ideally, the attenuation is at least 20 dB and in any case the attenuation should be at least 10 dB.

A sound-absorbent material A (shown in FIG. 3 but for clarity omitted from FIGS. 1 and 2) is positioned on selected interior surfaces of the housing 12, including surfaces of the baffles 24 and 26. The absorbent material A may be fiberglass, polyurethane foam or any other suitable sound-absorbent material. The effective thickness of the sound-absorbent material is equal to between approximately one-eighth and one-half of the wavelength of the relatively low main discrete frequency of the noise spectrum, but the preferred thickness is equal to approximately one-quarter of the wavelength. In a sine wave representing a pure tone, the maximum amplitude corresponds to a postion 90 degrees after the zero positive-going crossing of the sine wave. This corresponds to one-quarter of a wavelength, and the sound-absorbent material having an effective thickness equal to one-quarter of the wavelength of the relatively low main discrete frequency attenuates this frequency to a substantial degree.

Further in accordance with the invention, the inlet 16, outlets 18 and 20 and the air-passage 22 are of large cross section to enable the use of low air velocities at low back pressures. This is accomplished in accordance with the invention by limiting the air velocity so that it does not exceed 20% of the peripheral speed of the rotor. For example, in a 2-pole motor of the type referred to above, generating 700 horsepower, the rotor having a diameter of 12.3 inches, the rotor speed may be 11,592 feet per minute.

Ideally, the air velocity does not exceed 15% of that, or 1,739 feet per minute. At the upper limit, the air velocity may be allowed to reach 20% of the peripheral speed of the rotor, or 2,318 feet per minute. This is accomplished by providing an adequate cross-sectional flow area in relation to the volume of air passing through the cooling system.

In practice, it can be determined that the cross-sectional flow area is adequate simply by measuring the velocity of air at the most constricted portion of the system. If the air velocity as measured at the most constricted portion of the system does not exceed 20% of the peripheral speed of the rotor and preferably does not exceed 15% of the peripheral speed of the rotor, the back pressure will be adequately low and the noise generation will be significantly reduced, to the point where the other steps disclosed herein (e.g., the baffle placement, the selection of a predetermined material of a predetermined mass or thickness and the use of a sound-absorbent material to attenuate the low main discrete noise frequency) will be adequate to ensure efficient cooling with minimum noise propagated to the exterior of the housing 12.

Further in accordance with the invention, the outlets 18 and 20 are located relative to the electric motor 14 and direct exhaust air in such a manner as to minimize recirculation of the air. As FIGS. 7 and 8 show, the air enters in a direction which is generally radial of the electric motor 14. The electric motor 14 has an axial shaft 30 which defines the axial direction of the motor 14. The radial directions are orthogonal to the axial direction defined by the axis of the shaft 30.

Air entering an overhead hood 32 passes in a radially inward direction through columns 34 and 36 and into the electric motor 14 to cool the bearings, rotor, stator, and other portions thereof that tend to become excessively hot. This air can be routed in any conventional manner through the interior of the motor. The air is then discharged through the housings 12 on either side of the motor 14 (FIG. 8) and passes out in the axial direction: i.e., in a direction parallel to the axial direction defined by the shaft 30 of the motor 14. This minimizes recirculation of the exhaust air into the air intake hood 32 and thus contributes to the efficient cooling of the motor 14.

Figure 6:
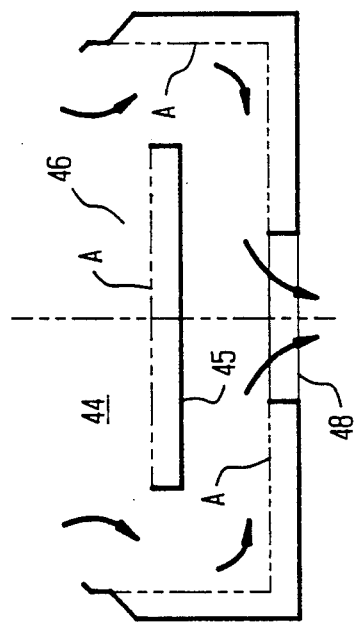
FIG. 6. is a view taken along the line 6—6 of FIG. 4 and looking in the direction of the arrows.
Figure 5:
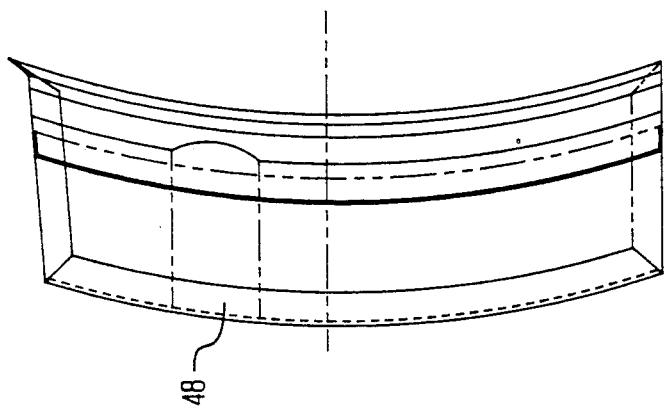
FIG. 5. is a view taken along the line 5—5 of FIG. 4 and looking in the direction of the arrows.
Figure 4:
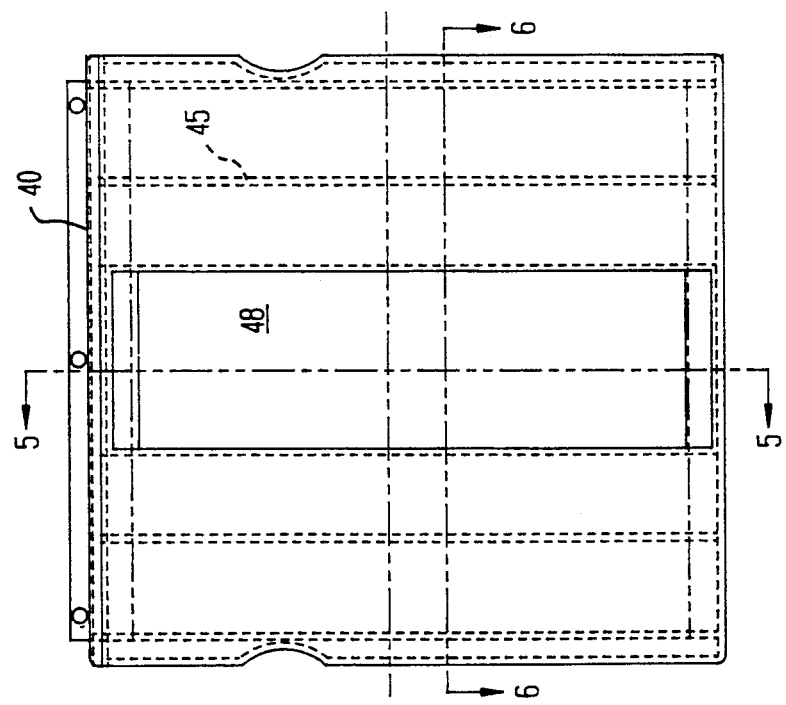
FIG. 4. is a view in side elevation of a second preferred embodiment of a muffler constructed in accordance with the invention.

FIGS. 4-6 show another preferred embodiment of the invention, in which the air is exhausted in the radial direction. Two housings 40 are mounted on either side of an electric motor 42 (FIG. 10). Air is drawn into the motor 42 in an axial direction (see also FIG. 9) and is expelled from the housings 40 in radial directions. The air enters the muffler through an inlet 44, flows through a passage 46, and exits through an outlet 48. A baffle 45 interrupts lines of sight from the passage 46 to the outside of the muffler. Sound-absorbent material A (shown in FIG. 6 but for clarity omitted from FIGS. 4 and 5) is positioned on selected interior surfaces of the muffler, including the rear surface of the baffle 45. The outlet 48 is located relative to the electric motor 42 and directs exhaust air radially in such a manner such as to minimize recirculation of the air.

Thus there is provided in accordance with the invention a novel and highly effective muffler for an air-cooling system used for channeling air for cooling heat-generating apparatus. The construction of the muffler is such that both low and high frequencies are greatly attenuated while heat-generating apparatus such as an electric motor is efficiently cooled. The placement of the housings relative to the electric motor and the directions in which air is exhausted from the housings are such as to minimize recirculation of the air. Thus the air inducted for the purpose of cooling the electric motor is essentially at ambient temperature and effective for its intended purpose; the exhaust air is discharged at a position physically removed from the point at which air is inducted and in a direction such that there is minimal mixing of the exhaust air with the inducted air.

Many modifications of the preferred embodiments of the invention disclosed above will readily occur to those skilled in the art. Clearly, the invention is not limited to the means employed for circulating the air within the apparatus to be cooled or to the size of the apparatus to be cooled. While the invention is particularly adapted for use with electric motors, it can also be employed with electric generators and other apparatus that produce heat and noise and that must be efficiently cooled and acoustically muffled. Accordingly, the invention is not limited except by the appended claims.

We claim:

1. A muffler for an air-cooling system used for channeling air for cooling heat-generating apparatus, the muffler comprising:

housing means mounted on the heat-generating apparatus and formed with air-inlet means, air-outlet means and air-passage means extending between and connecting the inlet means and the outlet means, whereby air from outside the housing means employed to cool the heat-generating apparatus enters the housing means through the inlet means, flows through the passage means and exits the housing means through the outlet means, noise having a spectrum of frequencies including a relatively low main discrete frequency, which corresponds to a relatively low wavelength, and a plurality of higher frequencies being generated in the cooling air during operation of the heat-generating apparatus and cooling system;

baffle means positioned within the housing means adjacent to the outlet means to interrupt lines of sight from the passage means to the outside of the housing means;

the housing means and the baffle means being made of a predetermined material having a predetermined mass, the material and mass being selected to attenuate direct egress of the higher frequencies of the noise spectrum to a substantial degree; and a sound-absorbent material positioned on selected interior surfaces of the housing means and having an effective thickness equal to between approximately one-eighth and one-half of the wavelength of the relatively low main discrete frequency of the noise spectrum;

the inlet means, outlet means and air-passage means being of large cross section to enable cooling of the heat-generating apparatus using low air velocities at low back pressures; and the inlet means and the outlet means being located relative to the heat-generating apparatus and directing exhaust air in such a manner to minimize recirculation of the air, wherein the heat generating apparatus is an electric motor having a rotor and the cross section of the inlet means, outlet means and air-passage means being chosen so that the air velocity in the housing is less than 20% of peripheral speed of the rotor when the motor is in operation.

2. A muffler according to claim 1 wherein the electric motor has rotor bars and the relatively low main discrete frequency is equal to the passing frequency of the rotor bars with respect to a reference point when the motor is in operation.

3. A muffler according to claim 2 wherein the passing frequency is within the range of 0.5 kHz to 4 kHz.

4. A muffler according to claim 1 wherein the predetermined material is a metal.

5. A muffler according to claim 1 wherein the predetermined material is a plastic.

6. A muffler according to claim 1 wherein the sound-absorbent material is selected from the group consisting of fiberglass and polyurethane foam.

7. A muffler according to claim 1 wherein the electric motor has axial and radial directions that are mutually orthogonal and wherein the cooling air enters the motor axially and exits the muffler radially.

8. A muffler according to claim 1 wherein the electric motor has axial and radial directions that are mutually orthogonal and wherein the cooling air enters the motor radially and exits the muffler axially.

9. In combination, an electric motor and a pair of mufflers mounted on opposite sides thereof, each muffler being constructed in accordance with claim 1.

10. A muffler for an air-cooling system used for channeling air for cooling a motor having a rotor, the muffler comprising:
 a housing mounted on the motor and formed with an inlet, an outlet and a passage extending between and connecting the inlet and the outlet, whereby air from outside the housing employed to cool motor enters the housing through the inlet, flows through the passage and exits the housing through the outlet and generates noise having a spectrum of frequencies including a relatively low main discrete frequency and a plurality of higher frequencies;
 a baffle positioned within the housing adjacent to the outlet means so as to interrupt lines of sight from the passage to the outside of the housing;
 a sound-absorbent material positioned on selected interior surfaces of the housing means, and
 said inlet, outlet and passage having a large cross section chosen so that air velocity in the housing is less than 20% of peripheral speed of the rotor when the motor is in operation.

11. The muffler of claim 10 when the relatively low main discrete frequency is equal to the passing frequency of the rotor bars with respect to a reference point when the motor is in operation.

12. The muffler of claim 11 wherein the passing frequency is within the range of 0.5 khz to 4 khz.

13. The muffler of claim 10 wherein the housing is made of metal.

14. The muffler of claim 10 wherein the housing is made of plastic.

15. The muffler of claim 10 wherein the baffle is made of plastic.

16. The muffler of claim 10 wherein the sound-absorbent material is selected from a group consisting of fiberglass and polyurethane foam.

* * * * *